United States Patent [19]

Stoy et al.

[11] Patent Number: 5,037,178
[45] Date of Patent: Aug. 6, 1991

[54] AMORPHOUS MEMORY POLYMER ALIGNMENT DEVICE

[75] Inventors: Vladimir A. Stoy, Princeton, N.J.; Francis T. Delahanty, Newtown Twp., Bucks County, Pa.

[73] Assignee: Kingston Technologies, L.P., Dayton, N.J.

[21] Appl. No.: 464,187

[22] Filed: Jan. 12, 1990

Related U.S. Application Data

[63] Continuation-in-part of Ser. No. 288,629, Dec. 22, 1988, Pat. No. 4,921,323.

[51] Int. Cl.⁵ .............................................. G02B 6/38
[52] U.S. Cl. ...................................... 385/53; 428/34.9; 385/15
[58] Field of Search ...................... 428/34.9, 188, 913; 156/86, 158; 350/96.2, 96.21

[56] References Cited

U.S. PATENT DOCUMENTS

| | | | |
|---|---|---|---|
| 3,086,242 | 4/1963 | Cook et al. | 264/566 |
| 3,359,193 | 12/1967 | Harris Planer | 522/117 |
| 3,370,112 | 2/1968 | Wray | 264/22 |
| 3,597,372 | 8/1971 | Cook | 523/300 |
| 3,616,363 | 5/1972 | Milian, Jr. | 522/153 |
| 4,178,067 | 12/1979 | Johnson et al. | 350/96.21 |
| 4,179,320 | 12/1979 | Midgley et al. | 428/34.9 |
| 4,261,644 | 4/1981 | Giannaris | 350/96.21 |
| 4,352,542 | 10/1982 | Tydings | 350/96.21 |
| 4,467,002 | 8/1984 | Crofts | 428/34.9 |
| 4,472,468 | 9/1984 | Tailor et al. | 156/86 |
| 4,489,217 | 12/1984 | Klopfer | 174/35 C |
| 4,597,632 | 7/1986 | Mallinson | 350/96.21 |
| 4,606,954 | 8/1986 | Rausing et al. | 428/34.9 |
| 4,707,388 | 11/1987 | Park et al. | 428/34.9 X |
| 4,725,117 | 2/1988 | Ellis | 350/96.2 |
| 4,804,733 | 2/1989 | Bataille | 428/34.9 |
| 4,816,326 | 3/1989 | Jones et al. | 428/34.9 |
| 4,865,892 | 9/1989 | Winfield et al. | 428/34.9 |
| 4,921,323 | 5/1990 | Delahanty et al. | 350/96.21 |

Primary Examiner—John D. Lee
Assistant Examiner—John Ngo
Attorney, Agent, or Firm—Kenneth P. Glynn

[57] ABSTRACT

The present invention is directed to a device and method for precise positioning, or alignment of one or more articles with respect to the device or to each other. The device comprises one or more elements of Unistructural Mass of Inherent Memory Polymer with one or more internal cavities which have inherent shapes with at least one cross-sectional configuration which is congruent to a cross-sectional configuration shape of the said article(s) in the positioned or aligned position(s). The unistructural mass has cross-sectional configurations which are the same or smaller than those corresponding to the positions of the articles. The unistructural mass is deformed such that the articles can be readily inserted into the corresponding cavities. In one embodiment, a single unistructural mass has a single cavity for precision positioning of the article. In another embodiment, the mass has at least two cavities for article alignment. In another embodiment, a plurality of unistructural masses are aligned or connected and each contains at least one such cavity. Once the articles are inserted into their corresponding cavities, the inherent memory polymer is returned to its inherent shape by non-mechanical stimulus to force the articles into precisely defined position.

53 Claims, 10 Drawing Sheets

AMORPHOUS MEMORY POLYMER ALIGNMENT DEVICE

REFERENCE TO RELATED PATENT APPLICATIONS

This application is a continuation in part of co-pending U.S. application Ser. No. 07/288,629, filed on Dec. 22, 1988 by Francis T. Delahanty, Vladimir A. Stoy and Shiu-Bor Tong for "Memory Polymer Optical Fiber Splice" and is now allowed (U.S. Pat. No. 4,921,323).

BACKGROUND OF THE INVENTION

Precise mutual positioning of two (or more) articles and/or their alignment are needed in a number of situations. For instance, two capillaries have to be aligned to secure smooth through-flow of liquid; two optical fibers are aligned to secure transmission of light in communication cables; two tubes are aligned for precise coaxial welding; two electrical connectors are aligned to secure conduction between corresponding contacts; and so on.

In other cases, the mutual distance of two articles or their parts is important as well, such as in the case of optical elements (lenses, prisms, mirrors etc.) assembled into an optical apparatus.

Such alignment or positioning is more difficult if the articles are very small and/or if the requirement on the precision of the alignment is very high. The positioning can be temporary in some cases and permanent in others.

The precise mutual positioning can be achieved by a number of methods of mechanical or optical nature which require very precise, expensive instrumentation and considerable skill.

An example of such a precise positioning and aligning method is fusion of two optical fibers by heat. Prior to the fusion, the two glass fiber ends have to be manipulated into a precisely coaxial position a very small distance apart. Because the fibers are typically around 100 microns in diameter and have to be positioned with micron or sub-micron precision in all three coordinates, the whole work has to be done under stereo-microscope by very precise X-Y-Z manipulators. Such methods are hardly suitable for inexpensive mass production, field repair etc. One group of methods used for precise positioning of optical fibers or electrical contacts utilizes so called "Memory Materials". Memory materials are either plastics or metals which have several common features:

a) Memory materials have two distinct types of behavior in two different temperature regions separated by a certain "transition temperature" Ts. (Namely, they are substantially more deformable above Ts than below Ts.)

b) Memory materials have certain "inherent shapes" into which they tend to return above Ts due to internal stresses (in substantial absence of external stresses). This shape is "inherent" (or exactly defined) with certain resolution or precision.

c) Memory materials can be deformed into a shape which differs from the said Inherent shape. The Memory Materials in Deformed Shape can hold internal stresses for very long time periods at temperatures below Ts.

Typically, the Memory Materials for the positioning application are manufactured in their Inherent Shape corresponding to the desired mutual positions of the two articles. Then the memory material is heated above Ts and deformed into a shape convenient for insertion of the articles, their assembly, etc.; and fixed in such "deformed shape" by decreasing temperature below the material's Ts.

The mutual positioning is then done in reverse order, using the Memory Material to return to its Inherent Shape (which corresponds to the desired positions of the parts) after being heated above Ts for a sufficient length of time. The methods using Memory Materials were described mainly for electrical connectors and splicing optical fibers.

Typically MEMORY MATERIAL SPLICERS have a continuous cavity which has an inherent diameter smaller than the diameter of the spliced fiber. Prior the splicing, the cavity size is increased by mechanical pressure above Ts and then fixed in its new (i.e. deformed) shape by decreasing temperature below Ts. The enlarged cavity can then readily accept the fiber ends, and the memory material is then heated above Ts so that the cavity collapses around the fiber forcing its ends into alignment and immobilizing the fibers at the same time.

Various modifications of this process and various "heat shrinkable" materials can be employed.

One group of such materials are Memory Metals described e.g. in U.S. Pat. Nos. 4,261,644; 4,352,542 and 4,597,632 or British Patent No. 1,555,475.

Another known group of Memory Materials are covalently crosslinked crystalline polymers known also as "heat shrinkable plastics" etc. and described e.g. in the U.S. Pat. Nos. 3,086,242; 3,359,193; 3,370,112; 3,597,372 and 3,616,363. Their use for connectors and splicers is described for instance in U.S. Pat. Nos. 4,178,067; 4,489,217 and 4,725,117.

There are several problems with the hitherto used memory materials. Memory metals have high density, they are not transparent and their deformation (particularly increase of the internal size of the cavity) is difficult to achieve. They are also made and processed at high temperatures which only a few mandrel or mold materials can withstand. They can be deformed only to a relatively small degree.

Hitherto known crystalline memory polymers have a different set of problems. First of all, crystalline memory polymers described so far are relatively soft at ambient condition because their amorphous phase has Tg lower than ambient temperature. Therefore, they cannot usually hold the articles positioned by themselves and require rigid support structures made of other materials.

Secondly, their Ts correspond to melting temperature of the crystalline phase and this phase transition prevents precise definition of the Inherent Shape. The softening and solidification of this type of memory polymer is caused by melting and recrystallization of the crystalline phase. The crystalline phase morphology defines the solidified shape and the crystalline morphology is, in turn, affected by external stresses. Therefore, there is no single unambiguous "inherent shape" below the melting temperature.

In addition, the crystallization is accompanied by substantial volume changes which may interfere with the alignment.

The known turbidity of crystalline polymers is also a disadvantage in some applications. Amorphous Memory Polymers (AMP) were not used so far for connecting or positioning of articles. Their memory properties and optical clarity were utilized for Intra-Ocular Lenses insertable through a small incision as described in U.S. Pat. No. 4,731,079. However, the Amorphous Memory Polymers for the intraocular lens have too low a Ts to be very useful in positioning or aligning articles in most cases.

AMP was also used for a simple device useful for splicing of optical fibers as described in the co-pending U.S. patent application Ser. No. 07/288,629 (U.S. Pat. No. 4,921,323).

SUMMARY OF THE INVENTION

Apparatus and method according to our invention is designed for precise positioning and/or alignment of one or more articles with respect to the apparatus. In the embodiments involving two or more articles, if two or more articles of the same, similar or dissimilar shape are aligned with respect to the apparatus, they are also connected and aligned and/or precisely positioned with respect to each other.

Connected articles are fixed with respect to at least some degree of freedom. They can be either in mutually fixed position or they can be in aligned position but free to move with respect to some of the degrees of freedom (translation along the axis of alignment, rotation of symmetrical articles along such axis, etc.).

This rather general description is designed to describe connection or alignment for various practical jobs where precise mutual positioning of two or more articles is important, such as: connecting or splicing optical fibers; connecting tubes for fluid transport; positioning of articles for machining or assembly; contacting electrical connectors; aligning optical elements and so on.

The alignment device according to our invention comprises one or more elements of Unistructural Mass of Inherent Memory Polymer (IMP) with one or more internal cavities which have inherent shapes with at least one cross-sectional configuration which is congruent to a cross-sectional configuration shape of the said article(s) in the positioned, connected and/or aligned position(s). The unistructural mass has inherent characteristic dimensions i.e. cross-sectional configurations, which are the same or smaller than those corresponding to the positions of the articles to be aligned; and the unistructural mass is deformed in such a way that the said articles can be readily inserted into the corresponding cavities. In one embodiment, a single unistructural mass has a single cavity for precision positioning of an article. In another embodiment, the mass has at least two cavities for article alignment. In yet another embodiment, a plurality of unistructural masses are aligned or connected and each contains at least one such cavity.

Once the articles are inserted into their corresponding cavities, the inherent memory polymer is heated above Ts in order to collapse the deformed cavities around the inserted articles and thus force the articles into a precisely defined position.

The precise shape of cavities in the IMP elements is preferably achieved by forming the three-dimensional covalent network of IMP around a position of an article to be aligned, or a duplicate thereof. Thus, the formed shape is congruent to the shape of articles in their desired mutual position at least as to one cross-sectional configuration. When the article or its duplicate, e.g. a mandrel, is removed, the corresponding cavity is formed within the memory material. The removal and the cavity enlargement is preferably achieved by swelling the memory polymer in a thermodynamically good solvent (TGS), although other enlarging methods may be used.

BRIEF DESCRIPTION OF THE DRAWINGS

The present invention is more fully understood when this specification is taken in conjunction with the appended drawings, wherein.

DETAILED DESCRIPTION OF THE INVENTION

Figure 1A:
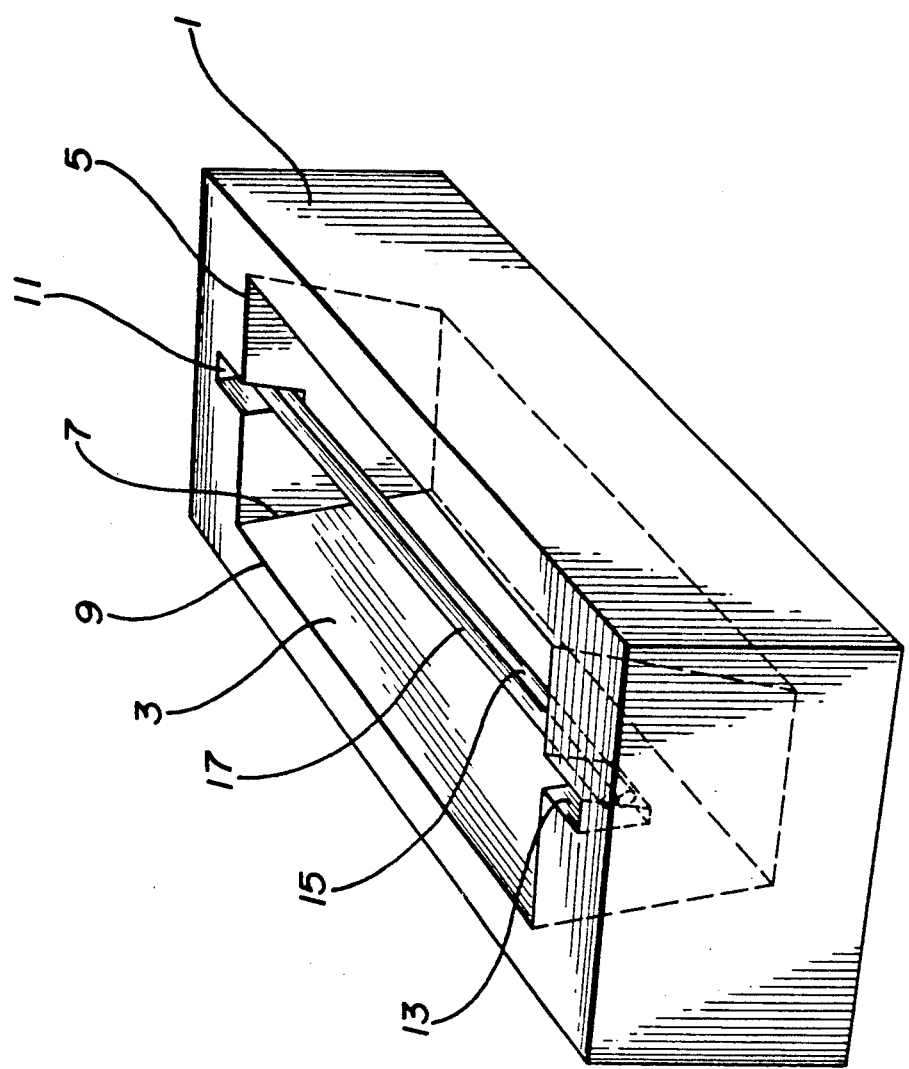
FIG. 1A illustrates a frontal oblique view of a polypropylene mold used for forming an alignment device of the present invention for optical fiber alignment and connection (splicing)

Inherent Memory Polymers (IMP) are polymer networks formed by links between polymer chains which are stable over the whole range of application conditions. Thus, IMP have constant crosslinking density in the temperature range including Ts temperature, and their Ts temperature is higher than ambient temperature but lower than any phase transition temperature or decomposition temperature of IMP.

This implies that the said links are formed by covalent bonds between the chains or by strong physical interactions between the chains which are stable in the working range of IMP. The physical interactions can have the character of crystalline domains in which said chains (or their segments) participate, providing that their melting temperature is substantially higher than Ts which is, in turn, higher than ambient temperature. The melting of the crystalline phase can be determined by X-ray diffraction methods well known to those skilled in the art. Melting or other phase transitions can also be detected and studied by well known calorimetric or thermomechanical methods. Because the covalent bonds are typically more thermally stable than physical interactions, the preferred type of IMP contains a substantial portion of covalently crosslinked amorphous phase with Tg lower than temperature of any phase transitions but higher than ambient.

Particularly preferred type of IMP for our invention are polymers with single polymer phase which is crosslinked amorphous phase. Such polymers are hereinafter called "Amorphous Memory Polymers". Such polymers can be readily differentiated from crystalline polymers by X-ray diffraction or other known methods.

Amorphous Memory Polymers (AMP) are three dimensional polymer networks in which essentially each polymer segment is connected by covalent bonds to all other polymer segments and substantially no polymer chain or segment of the network is organized in a polymer crystalline phase. This way any continous piece of AMP forms a single giant molecule that can be called a "unistructural mass". AMP exists in so called "glassy state" below a certain temperature called "glass transition temperature" or Tg. "Glassy state" is state in which AMP is highly rigid, with very small and reversible deformation up to its break stress. On molecular level, glassy state is state in which large polymer segments are substantially immobilized with respect to one another and vibrational motion modes prevail.

At temperatures sufficiently high above Tg, AMP exists in typical elastic rubbery state with low modulus of elasticity and substantially fully reversible deformability.

Between these well developed glassy and elastic regions, there is a viscoelastic region where deformation and recovery processes are time-dependent and generally thermodynamically irreversible.

Modulus of elasticity in AMP decreases several orders of magnitude in transition from glassy to fully developed elastic state.

In AMP the Tg corresponds to the transition temperature Ts which defines the two main regions of shape memory behavior. Ts, or softening temperature, is often used instead of Tg because it is relatively easier to measure (eg. by ASTM D569-48 method). Ts in IMP containing some crystalline phase also relates to the Tg of the amorphous phase while the crystalline phase is the same below and above Ts.

This character of the transition is one of the major differences between IMP (in general) and AMP (in particular) on one hand and the Crystalline Memory Polymers (CMP) on the other. CMP have Ts corresponding to melting temperature of their crystalline phase Tm.

Another major difference between CMP and IMP is that IMP have same phase composition below and above Ts. For instance, AMP consist of one single amorphous phase both below and above Ts and there is no phase transition taking place at or near Ts.

Conversely, CMP consist of two polymer phases (amorphous and crystalline) below Ts and single amorphous phase above Ts and its transition at Ts is a true phase transition.

The major advantages of IMP in general and AMP in particular over CMP are derived from these basis structural differences and they are the following:

a) IMP are rigid, strong polymers at ambient temperature so that they do not need any protective or stiffening mechanism or parts from other materials. In contrast to that, CMPs typically contain portions in their structure which are not in glassy state in the full range of use conditions. Hence, CMPs are typically softer and less stable dimensionally and thermally than IMPs.

b) IMPs have their inherent shape defined with much higher precision than CMP due to lower shrinkage during solidification. CMP are deformable above the melting temperature of their crystalline phase. The CMP solidification is accompanied by a significant volume change due to the crystallization. IMP do not experience any such phase transformation while AMP lack the crystalline phase to begin with. Thus, the volume changes of IMP with temperature are much smaller, more gradual and more controllable.

c) IMPs have their inherent shape defined with much higher precision than CMP because of IMP's constant network density in Ts range. Namely, crystalline polymers organize their morphology according to the outside conditions, adjusting their "apparent network" to the circumstances. Therefore, their inherent shape is defined to some extent by outside stresses which it is supposed to overcome. This "feedback" relation defies the precise inherent shape definition because "Inherent Shape" of CMP is not truly unique or inherent. Moreover, the "inherent shape" of crystalline polymers cannot be defined even in absence of external stresses with resolution better than the size of the largest spherulites or crystallites. In most cases, the size of crystallites is often in micron range or larger; spherulite size is typically much larger than that and can be as large as millimeters.

Conversely, IMP have inherent shape independent of outside stresses and AMP have their inherent shape entirely unique depending only on topology of its covalent network.

d) AMPs are transparent while crystalline polymers including CMP are opaque to turbid. This is substantial advantage of AMP in many cases.

IMP also have a number of advantages over Memory Metals. The main advantages of IMP (and particularly AMP) over Memory Metals are the following:

a) IMP have broad range of transition temperatures and Ts can be readily controlled; in particular, it is much easier to depress Ts to a conveniently low range. Memory metals have rather narrow selection of Ts values.

b) Modulus of elasticity of IMP can be controlled in very broad by range polymer composition and crosslinking density, while there is only a narrow choice for Memory Metals.

c) IMP can be transferred from inherent to deformed shape by swelling in suitable solvents, while Memory metals can be deformed by mechanical forces only.

d) IMPs can be created at low temperatures and formed directly around mandrels from miscellaneous materials; Memory alloys have to be cast at high temperatures so that there are few suitable mandrel materials.

e) IMPs are transparent while Memory Metals are not.

f) IMPs have much lower density then Memory Metals.

There is a wide selection of polymers with crosslinked amorphous phase exhibiting shape memory properties. The IMP suitable for our invention have Ts higher than ambient temperature and preferably higher than about 50 degrees Centigrade. In some cases it is necessary to increase Ts toward or even above 100 deg. C. to maintain its rigidity in a wide range of temperatures.

There is no upper limit for Ts other than that imposed by melting temperature of crystalline phase (if any), thermal resistance of the memory polymer used and resistance of the connected articles. Ts of IMP is controlled by selection of main-chain polymer and/or use of low-molecular plasticizers.

The use of plasticizers allows us to change Ts during its processing or select different Ts for different steps of aligning procedure as will be explained later.

IMP may have broad range of chemical compositions well known or easily established by those skilled in art of plastics and polymers. IMP can be based on various polymers and copolymers with hereto-atoms in their main chain such as epoxy resins, polyarylsiloxane resins, polyurethanes, polyureas, polyesters, polycarbonates, polyamides, polyimides or polyethers.

Preferred IMPs are based on polymers with carbon main chain because of their superior resistance to degradation, precise control of crosslinking density, softening or transition temperature, and ease of manufacture.

Particularly preferred are AMPs based on monomers with vinyl, allyl, acryl or methacryl polymerizable double bonds. Preferred in this group are derivatives of methacrylic acid. Particularly preferred are esters of methacrylic acid and aliphatic, cycloaliphatic or aromatic alcohols, such as methanol, ethanol, ispropanol, cyclohexylalcohol, benzylalcohol, borneol, isoborneol etc.

Various monomers can be combined in one copolymer to achieve desired thermomechanical, swelling or other properties.

Crosslinking of the Inherent Memory Polymers can be achieved in many ways well known to those skilled in the art. For instance, well known is the crosslinking of linear or branched precursors by ionizing radiation. Another well known method is reaction of polymeric precursors with reactive bi- or polyfunctional crosslinking agents, such as diols, diisocyanates, diepoxides, diamines and so on.

Preferred method of crosslinking is copolymerization of said vinylic, methacrylic or acrylic monomers with co-monomers containing two or more copolymerizable double bonds such as bisalkylene methacrylates, bisalkylene acrylamides, divinylbeneze, allylmethacrylate, alkyleneglycoldimethacrylates and others. Advantage of this method is precise control of crosslinking density and good control over residuals including residual reactive sites which could cause undesired changes of properties over extended periods of time.

Crosslinking density affects several important properties of IMP: modulus of elasticity and deformability above Ts, hardness below Ts and maximum swelling in Thermodynamically Good Solvents (TGS). The network density of IMPs suitable for our invention can be controlled in a very broad range so that the average number of monomer units between links can be between about 5 and 1000, depending on the basic polymer composition, specified application and manufacturing method. Preferred average number of monomer units between two links is between about 10 and 100 and even more preferably between about 20 to 75. The concentration of covalent links is more readily controllable than density of physical links. This is one of the reasons for our preference of AMP (which contain only one type of link) over IMPs containing non-meltable crystalline phase or other type of strong interaction.

The cavity in the unistructural mass of IMP can be created in a number of ways, such as precision drilling, etching, cutting or ablating by laser, etc. The inherent cavity shape is congruent to the shape of the articles in their connected and/or aligned positions; and its size is the same or smaller than the size of said articles.

The preferred method of making such a cavity is by forming the three dimensional network around a solid mandrel which has shape congruent to the final cavity shape; and once the network is formed, the mandrel is removed leaving the vacant cavity in the unistructural mass. AMP forms such networks (in fact, a huge molecule) by covalent crosslinking, copying the mandrel shape with great precision.

If the crosslinking is done on a polymeric precursor, such as linear polymethacrylate or polyvinylpyrridine, the polymer can be formed around the mandrel by well known methods such as extrusion, compression molding or injection molding, and the polymer is then crosslinked in the solid state by eg. irradiation. Also well known is Reactive Injection Molding (RIM) where a two-component mixture of polymer precursor and crosslinker solidifies in the mold around the mandrel. This method in suitable e.g. for polyurethanes or epoxides.

Another known method is crosslinking by spontaneous chain transfer during polymerization of certain monomers, such as derivatives of acrylic acid.

Our preferred method is copolymerization of the monomer mixture containing both monomer and polyfunctional crosslinking comonomer around the mandrel in which polymer is formed and crosslinked at the same time. This method is preferred in many cases because of its capability to copy the mandrel of even very small size and/or complicated shape with very high precision.

Several of the above methods can be combined. For instance, the monomer mixture can be polymerized and crosslinked by irradiation and/or can have a polymer precursor dissolved in the monomer mixture.

Once the final network is formed, the mandrel has to be removed from the cavity. Reusable mandrels can be made of several parts to facilitate their removal.

If the mandrel is for one use only, then one possible method of removal is selectively etching or dissolving the mandrel by suitable solvents or chemicals. For instance, if the memory polymer is chemically stable (e.g. polystyrene crosslinked by divinylbezene) and the mandrel is made of glass or Nylon 6, the mandrel can then be etched away by hydrofluoric acid or formic acid, respectively.

The preferred method of mandrel removal is swelling of the memory polymer in Thermodynamically Good Solvents (TGS) for that particular polymer composition which expands the polymer, turns it flexible, enlarges the cavity and cancels adhesion between the mandrel and the Memory polymer so that the mandrel can be readily removed. This method is suitable for both reusable and disposable mandrels.

Inherent size of the cavity (i.e. its size if heated above Ts for a sufficient time and then cooled in absence of external stresses) has to be equal or smaller than the size of the corresponding article. The inherent cavity size is related to the size of the mandrel and volume fractions of polymer in the state of the network formation and in the final (i.e. working) state. The polymer in the course of crosslinking can be diluted to various degrees. If the volume fraction of diluent at the end of crosslinking is $v(d)$; a linear dimension of the mandrel (e.g. diameter in certain part) of $L(m)$; and the volume fraction of polymer in the final working state (i.e. after the cavity collapse) is $v(p)$, then the corresponding inherent linear dimension of the cavity will be approximately:

$$L(c) = L(m) * \{[1 - v(d)]/v(p)\}^{\wedge}(\tfrac{1}{3}) \quad (1)$$

Because AMP is an isotropic polymer, the relation by Eq. (1) holds for any linear dimension. The inherent cavity can be made both larger or smaller than the mandrel by using suitable diluents, plasticizers, fillers or extenders controlling values $v(d)$ and $v(p)$.

The use of diluent in the course of crosslinking can be an advantage for a number of reasons. First, we may use a mandrel larger (therefore, easier to manufacture and handle) than the connected article. Second, the memory polymer is formed in flexible state to facilitate mandrel removal, swelling, etc. Thirdly, plasticized article is easier to remove from the mold without damage.

The use of plasticizer, extender or filler in the final state can modify thermomechanical properties. For instance, a slightly volatile plasticizer can decrease the working temperature for the aligning procedure; as it evaporates over time, it turns IMP resistant to higher temperature (increasing Ts) and develops a stronger "grip" (increasing $v(p)$) over time. If a non-volatile monomer is used as the plasticizer which can be converted into additional polymer over some time period (under influence of heat, UV light or other radiation) then Ts increases over time with smaller contraction of the unistructural mass. These options help to adjust our invention for various specific applications.

Prior to use of the apparatus, the size of the cavities in IMP have to be increased over their inherent size to be able to receive the articles to be connected and/or aligned. The shape of enlarged cavity does need to be necessarily congruent with the inherent cavity shape. (For instance, a cylindrical cavity can be deformed into a hexagonal crossection. Important is the ability to receive the articles, not the shape itself.)

The cavity expansion has to be done above Ts and can be achieved by various methods. For instance, the cavity size can be increased by pressure of a fluid inside the cavity in IMP heated above Ts.

Alternatively, cavity can be gradually enlarged by expandable mandrels or by inserting mandrels of gradually increasing size, all this while IMP is above Ts.

IMP can be set into its deformable state above Ts either by heating the polymer, or by depressing Ts by suitable TGS or plasticizers, or by combination of both.

It is well known that TGS depresses Tg (thus also Ts in case of IMP) by increasing mobility of polymer segments.

Swelling of IMP in suitable TGS is, in itself, a convenient and preferred way to achieve deformation. Namely, the swelling in so called "thermodynamically good solvents" (TGS) makes the polymer more deformable and increases its volume at the same time. The volume increase by swelling depends on several parameters which are specific to the given polymer-solvent pair: densities of the polymer, solvent and their mixtures; polymer network density; strength of interaction between polymer and the solvent.

The strength of the interaction can be expressed in various ways, such as from well known Hildebrand parameters for the polymer and the solvent. The data needed for selection of TGS for various polymers can be found in various handbooks, such as A.F.M. BARTON: CRC HANDBOOK OF SOLUBILITY PARAMETERS AND OTHER COHESION PARAMETERS (CRC Press, Inc., Boca Raton, Fla.; 1983).

Another convenient way to express the swelling capacity of a solvent is via the Chi parameter in the well known Flory-Huggins equation. TGS have Chi<0.5 for the given polymer-solvent pair.

The deformation of a linear dimension in isotropic polymers is increased by a factor LM which is the cubic root of the factor of volume increase by swelling (or factor of polymer volume fraction decrease by swelling). Because the volume of a polymer can increase many times by swelling, the capacity for the deformation by swelling is substantial.

Volume increase by swelling also depends on temperature, on interaction parameters of the solvent and the polymer and on the network density of IMP. The higher the network density, the lower the maximum swelling and the stiffer and stronger is the IMP both in swollen and dry state.

The preferred IMP in our invention has a network density such that in IMP swollen in a TGS (Chi 0.3 to 0.4) the volume fraction of polymer is not lower than 0.05 and preferably not lower than 0.1.

There is no practical lower limit on swelling as long as IMP can be sufficiently deformed by combination of the swelling and increased temperature. It is preferred though, that the maximum achievable swelling in a TGS is not lower than to correspond to maximum volume fraction of polymer of about 0.67 and more preferably to about 0.5, in the state of maximum swelling.

The swelling can be done in the conventional way, i.e. by contacting the polymer with the excess of suitable solvent at a suitable temperature for the time needed for full swelling. It is also possible to add the solvent during the crosslinking step as a diluent, as mentioned above. Both methods can be combined to suit a particular application. Once the unistructural mass is deformed to the sufficient degree (i.e. for cavities to accept the articles), it has to be fixed in deformed state by setting the IMP into its glassy state. This can be done by cooling and/or increasing Ts by removal of solvent while the deformed state is maintained by external forces. The implementation of this requirement is self-obvious if the deformation was caused by the external forces to begin with.

If the deformation was caused by swelling (i.e. by forces derived from the solvent-polymer interaction), the deformed shape of the cavity has to be maintained by suitable means. One preferred way is to insert a solid mandrel which is somewhat smaller than the cavity in its maximally deformed shape, but somewhat larger than the article to be used in that cavity. This secondary mandrel has to be then removed from the solidified unistructural mass. It is an advantage if the secondary mandrel is slightly deformable to facilitate its removal.

Another preferred way to maintain the cavity size is to fill the cavity with a fluid which is not a swelling agent for the given IMP, and preferably not highly volatile (such as a wax, paraffin, polyethylene glycol, glycerol etc). This "liquid mandrel" has the advantage of being readily removable from cavities of complex shapes. Its additional advantage in some cases is that it maintains the isotropic deformation of the AMP achieved by the swelling in TGSs. The removal of the TGS can be done by evaporation, extraction by solvents which swell the IMP less than the original solvent, or by the combination of both.

After the unistructural mass has been fixed in the deformed state, the secondary mandrels can be removed and the apparatus is ready for the mutual positioning and/or aligning of one or more articles. The positioning and/or aligning method according to our invention consists of the following steps:

1) The articles to be mutually positioned and/or aligned are inserted into the corresponding deformed cavities. The articles may or may not be in mutual contact, depending on the goal of the aligning procedure. The articles may or may not be completely surrounded by the IMP. If the articles are sufficiently rigid, then even the parts outside the cavities are positioned and/or aligned with great precision.

2) Memory material is heated above its transition temperature Ts. Return of the cavities from their deformed to inherent crossections aligns the articles exactly. The maximum retraction aligning force is achieved in the viscoelastic region of IMP, at temperatures not too different from Ts. Typically, the maximum efficiency is achieved at a temperature interval within about 20 deg. C. from Tg of the IMP's amorphous phase. The heating procedure is preferably designed to utilize this temperature interval.

3) Memory material is cooled down below Ts, thereby solidifying and fixing the articles in their aligned positions.

As the cavities collapse around the inserted articles, we may either want them completely immobilized or keep them aligned but movable along the axis of alignment.

In the former case, it is advantageous if the memory material has a larger coefficient of thermal expansion than the material of the aligned articles. The contraction by cooling between the Ts and final temperature (e.g. ambient) will be then larger for the cavity than for the article and the article will be held in place by normal pressure of the memory material.

In the latter case, it is advantageous to select a memory polymer with a thermal contraction in the solid state somewhat smaller than that of the aligned articles over the same temperature interval. Then a minute separation will develop between the article and the cavity walls which will facilitate the movement.

Our invention is further illustrated by the following non-limiting Examples:

EXAMPLE 1

This example describes a device and method for precise alignment and permanent connection ("splicing") of two optical fibers usually employed in optical signal transmission. This device uses two parallel cavities which are collapsed around an aligning pin and the spliced optical fibers, respectively.

Such fiber has a cylindrical core of silica glass with a higher refractive index than the glass cylindrical jacket surrounding the core. The outer diameter of a standard optical fiber is 125 microns. The fiber is coated with a protective plastic sleeve or "buffer".

The polypropylene mold 1 used for the device production is depicted in FIG. 1A. It has approximately rectangular cavity 3 with typical edges 5, 7 and 9. Vertical slits 11 and 13 for holding mandrels 15 and 17 are in the center of edge 5, their tips reaching approximately the middle of the depth of edge 7.

Two sections of denuded glass optical fiber of outer diameter 125 microns are inserted into the slit side by side in continuous contact. These sections of fiber serve as primary mandrels 15 and 17 to form cavities of precise shape and dimensions.

The mold 1 is then filled with degassed monomer mixture of the following composition: 20 weight parts (wp) of Ethoxyethyl acetate; 77 wp of Methyl Methacrylate; 3 wp of Tetraethyleneglycol-bis-Methacrylate; and, 0.05 wp of dibenzoyl peroxide.

The filled mold 1 is covered with a glass cover and heated under a nitrogen blanket at 70 deg. C. for 8 hours plus 2 hours at 110 deg. C.

Then the mold 1 is cooled down and the clear plastic molding (including the embedded glass fibers) is removed from the mold 1. The molding is then swollen in an excess of Ethoxyethyl Acetate, which is known as a Thermodynamically Good Solvent (TGS) for the crosslinked poly (Methyl Methacrylate). The glass fibers are pulled out readily from the swollen polymer by tweezers.

The rectangular elastomeric article has a straight cavity of "eight-shaped" profile from two communicating cylindrical holes.

The piece is swollen by the solvent to the extent that Nylon 6 threads (secondary mandrels of approximately 140 microns in diameter) can be pulled through the holes. The solvent is then gradually extracted with methanol. This deswells the memory polymer which shrinks in size and becomes more rigid as methanol replaces the original solvent.

The polymer and inserted nylon mandrels are then dried overnight at 65 deg. C. and finally 4 hours at 125 deg. C.

Once the device is cooled, one of the mandrels is pulled out and a continuous piece of the glass fiber (the primary mandrel) is reinstated into the cavity. The device is reheated to 125 deg. C. for about 10 minutes and cooled again. The unistructural mass 21, shown in FIG. 1B, is created when the memory polymer collapses around the glass fiber section which now forms a pin 23, guaranteeing precise alignment of both pin cavity 25 and open cavity 29.

Referring again to FIG. 1C, the splicing procedure is carried out as follows:

1) One of the protruding ends of a secondary mandrel is cut off cleanly and drop of UV-curable adhesive (e.g. Loctite Lite-Tak) is applied in cavity 29. Then the mandrel is extracted by pulling out its other end. This causes part of the adhesive to be sucked into the cavity. The excess of the adhesive on the splice face is wiped off.

Figure 1B:
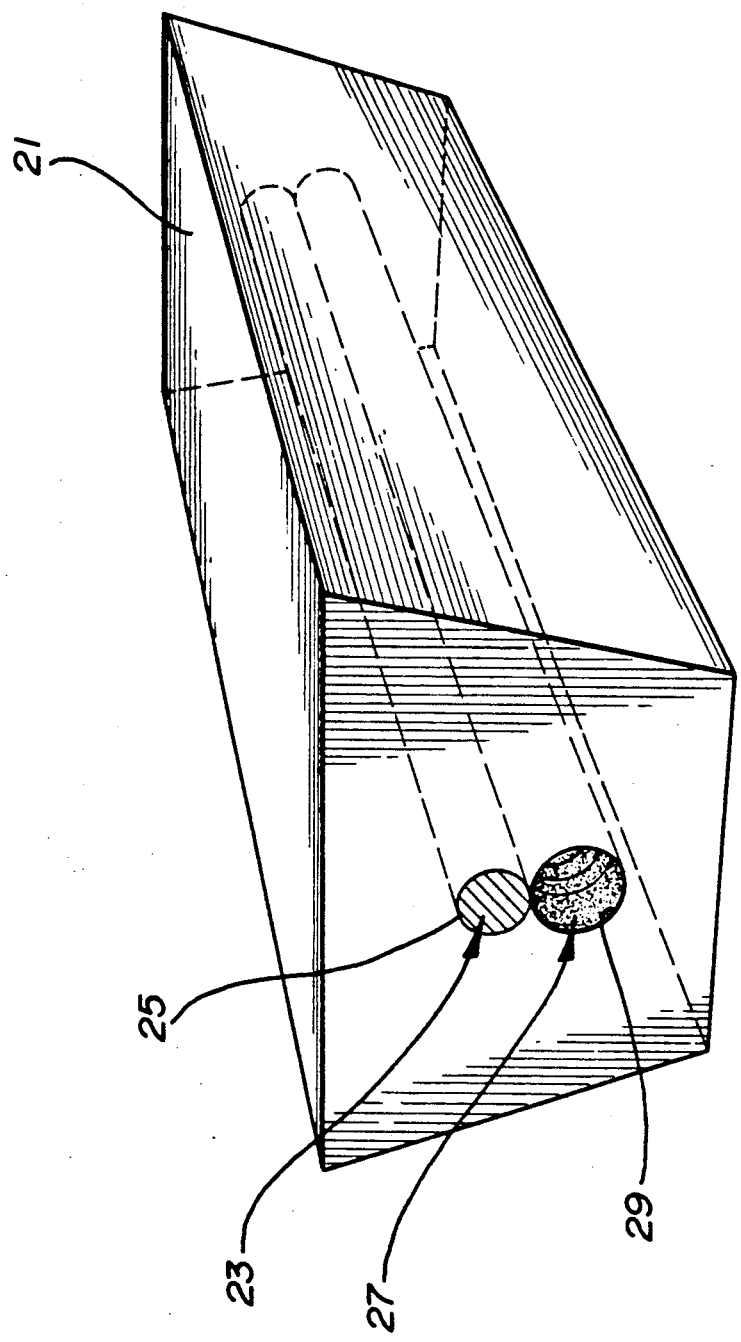
FIG. 1B shows an oblique view of a present invention alignment device produced with the FIG. 1 mold before being used for splicing.

FIG. 1B shows the splice ready for splicing where the unistructural mass 21 has cavity 29 deformed to the size of the secondary mandrel (about 140 microns in this case); glass aligning pin 23 of diameter about 125 microns; UV-curable adhesive 27 deposited on the walls of the deformed cavity 29.

Figure 1C:
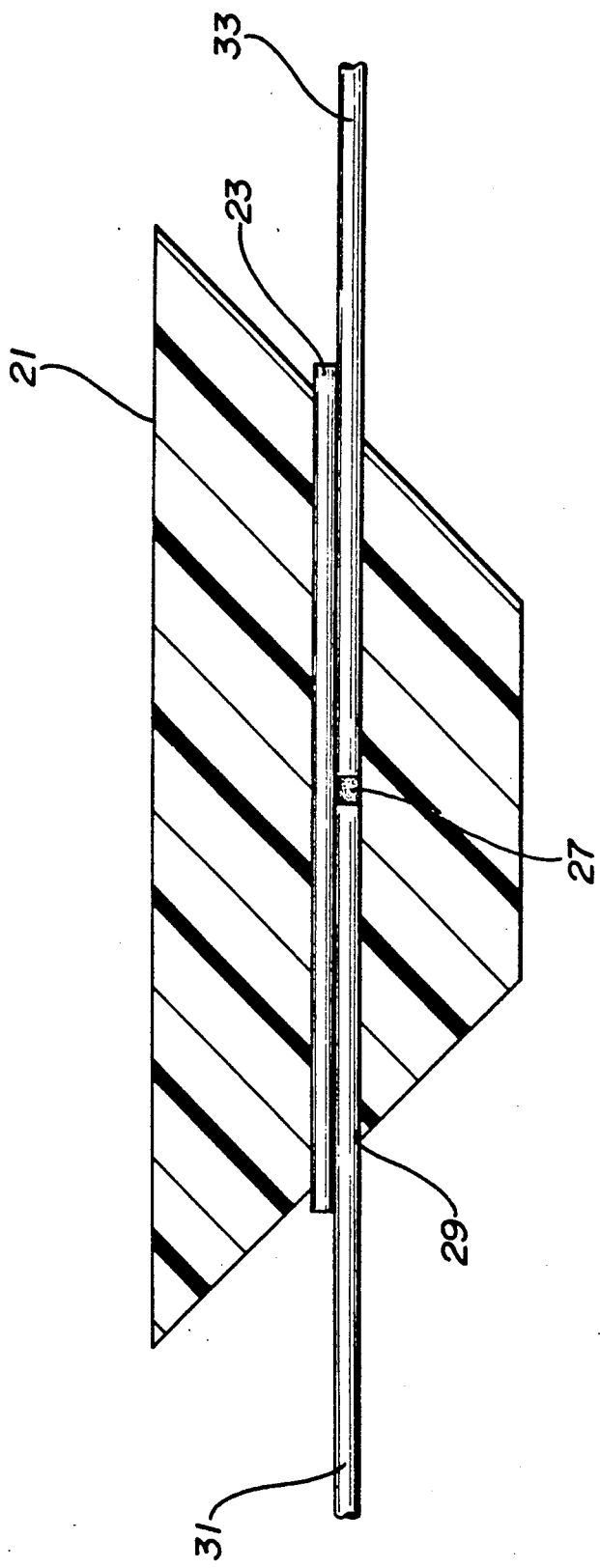
FIG. 1C shows a side cut view of the present invention FIG. 1B alignment device with spliced fibers contained therein.

2) Denuded, cleaved ends of optical fibers 31 and 33 shown in FIG. 1C, are inserted into the cavity 29 from opposite sides until they are in intimate contact. Then the splice is heated to about 125-140 deg. C. by a stream of hot air for about 1 minute.

3) After cooling, the fibers are aligned but they can be rotated until the transmission loss is at a minimum. The splice is then exposed to UV light which solidifies the adhesive 27. The final splice is shown in FIG. 1C.

One functional advantage of this splice is in the separate operations of: alignment achieved by heating, and securing of fibers in an optimum position achieved by UV-curing of the index-matching adhesive.

Another functional advantage is alignment of the optical fibers with respect to the aligning pin which is more precise than relying only on the inherent shape of a single cavity.

EXAMPLE 2

Figure 2:
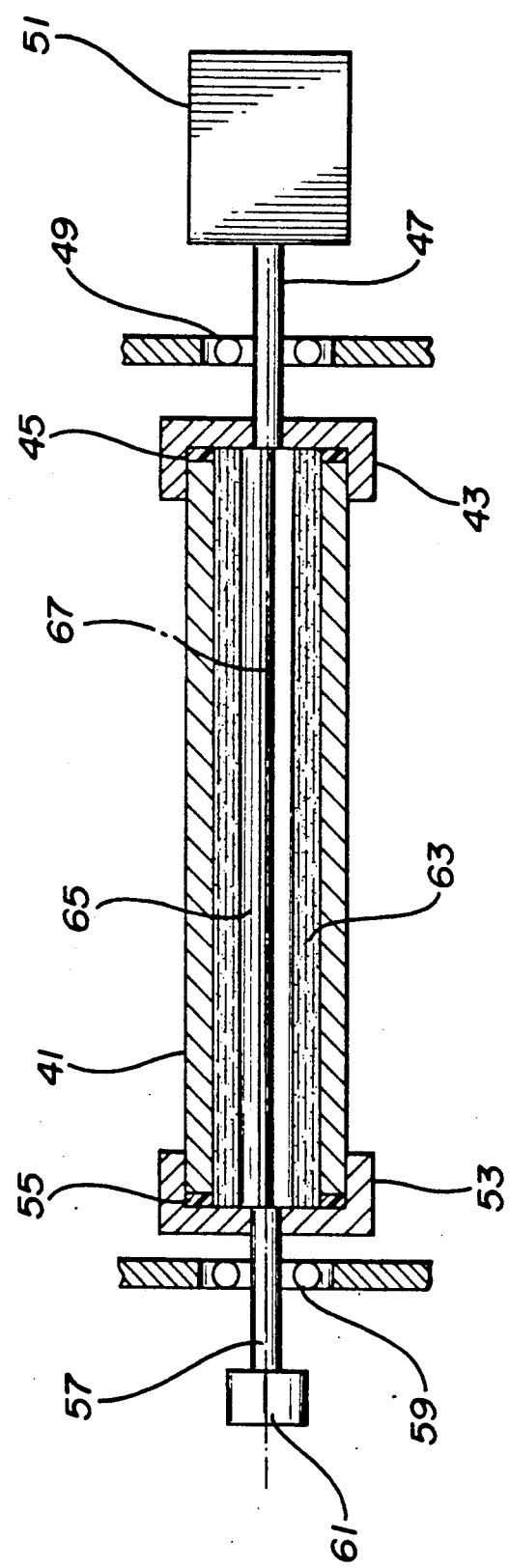
FIG. 2 illustrates a side cut view of a present invention device used for the manufacture of a precisely concentric cavity formed by solidification of a resin on the surface of a spinning liquid.

This example describes a method of forming a cylindrical cavity in precise alignment with a cylindrical outer surface of the device by solidification of a resin on the surface of a spinning liquid which is immiscible with the liquid resin precursor and has a higher density. Such a liquid can be, for instance, water, a salt solution, molten inorganic salt, molten metal alloy, mercury and so forth. The apparatus for the spin casting is in FIG. 2:

Cylindrical vessel 41 is enclosed on one end by the lid 43 with the seal 45 and shaft 47 which is held by the bearing 49 and connected to the electrical motor 51.

The similar lid 53 sealed by seal 55 is on the other end of the vessel 41. The lid 53 is equipped with hollow shaft 57 which is held by bearing 59 and ended by filling valve or enclosure 61.

The vessel 41 is filled with precisely metered amounts of a suitable liquid (such as filtered mercury) and a liquid precursor to a crosslinked resin (such as the monomer mixture from Example 1). As the vessel 41 spins at sufficiently high angular velocity, the monomer mixture and the said other liquid form cylindrical layers stratified by densities so that the most dense liquid 63 is the outermost, the resin precursor 65 is in the middle and the lightest fluid 67 is in the axial region. The fluid 67 can be a low-density liquid immiscible with the other components. More often, the fluid 67 is a gas. The volume of 67 increases as volume 65 shrinks due to the resin solidification (curing). The volume 67 can even be entirely due to the curing contraction.

The curing of the resin under high-speed rotation forms a precisely concentric tube with dimensions which can be readily predicted from the vessel volume and diameter, amounts of liquid components and known volume contraction during the resin solidification.

The precision tube is then deformed to increase its central cavity diameter. For instance, the tube is heated above the softening temperature of the resin, deformed by pressure of an inert fluid (ie. fluid which does not swell and/or plasticize the resin) inside of the cavity; and cooled to ambient temperature under pressure.

Cylindrical articles to be aligned can then be readily inserted into the enlarged cavity. If the device is heated above the softening temperature of the resin, the cavity collapses around the article aligning the article with respect to the outside surface of the device. The tube is then cooled to ambient temperature setting the resin into the glassy state to maintain and secure the aligned configuration.

EXAMPLE 3

The process according to Example 2 can be performed with a mixture of polymeric bis-epoxide and an aliphatic diamine which forms a sparingly crosslinked epoxy resin on the spinning mercury surface. The curing reaction is carried out above $T_g$ of the cured resin so that conversion is practically complete at 125 deg. C. after 24 hours.

The volume shrinkage by crosslinking at this temperature is 0.17%. The amounts of the components are selected so that the final diameter of the resin tube is about 2.500 mm and the inner diameter 0.110 mm.

The mold is cooled down and the rigid precision tubing is connected by both ends to a hydraulic pump containing glycerol.

Then the tube is heated to abut 130 deg. C. and glycerol pressure is increased to expand the inner cavity tubing to about 135 microns. The tube is cooled down while the pressure in the cavity is maintained.

The tube is then cut to short sections (5 mm) and its ends are polished. The sections can be used as ferrules for connection of optical fibers.

Figure 3:
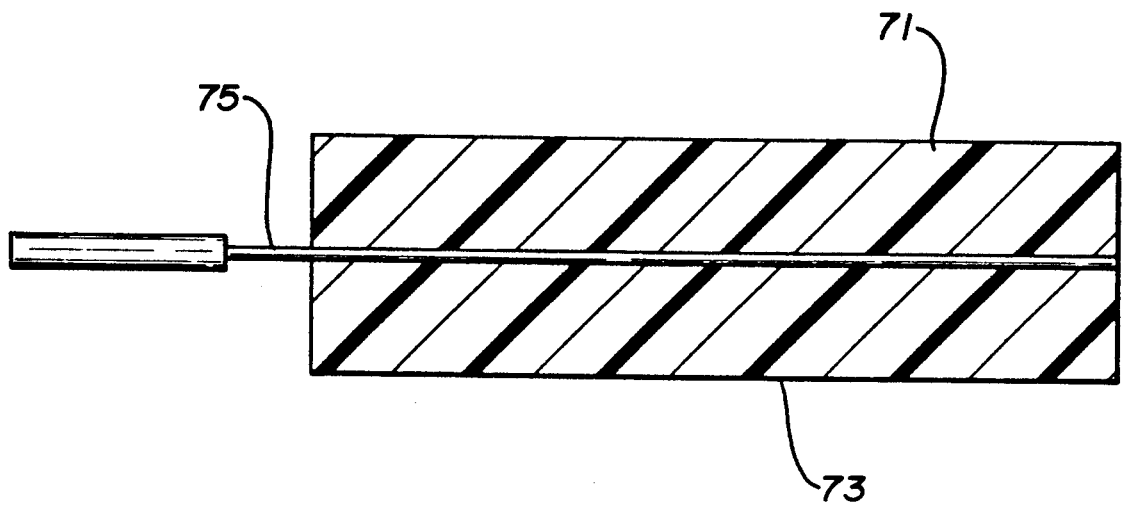
FIG. 3 shows a side cut view of a present invention alignment device for precise coaxial alignment utilizing the device itself as a ferrule.

The connection with the optical fiber is made as follows: Denuded end of an optical fiber (125 micron diameter) is inserted into the cavity so that the faces of the fiber and of the ferrule are in one plane. Then the tube is heated to about 135-150 deg. C. for about thirty seconds and cooled down. The change of the outside diameter due to the fiber insertion is less than 1 micron. The final configuration is schematically depicted in FIG. 3 where 71 is the unistructural cylindrical IMP body in which the precisely cylindrical outside surface 73 is precisely coaxial with the glass optical fiber 75. The advantages of this ferrule are low cost and simple installation without using adhesives.

EXAMPLE 4

Figure 4:
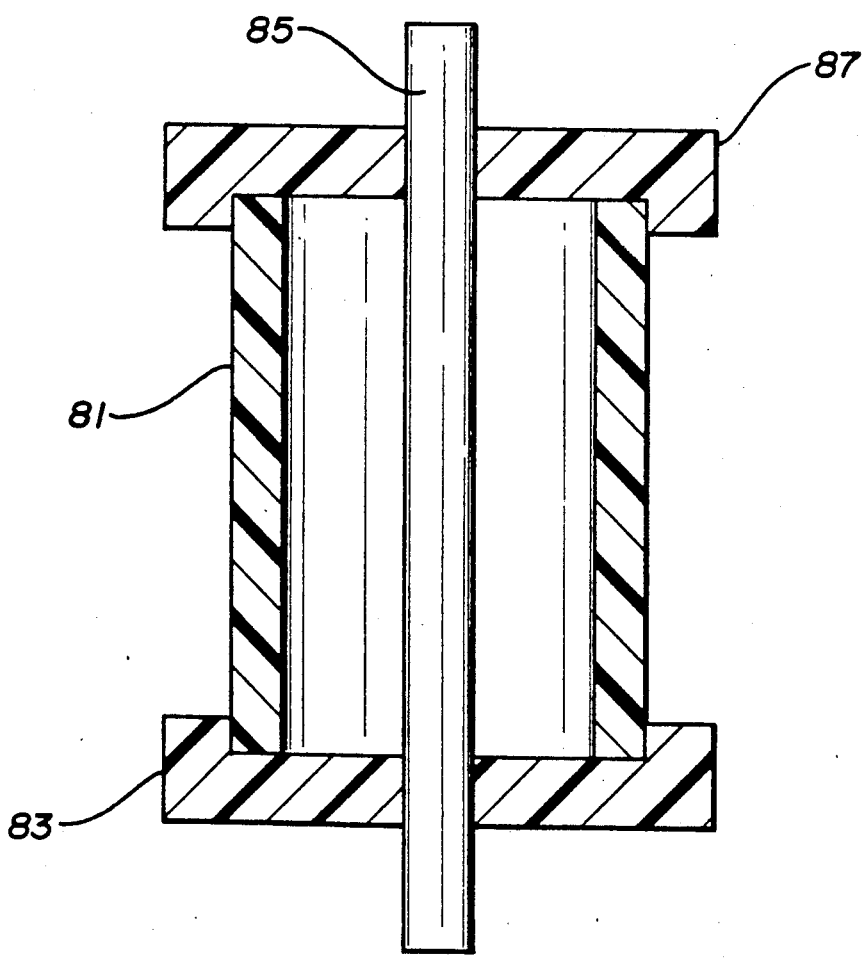
FIG. 4 illustrates a mold for forming another alignment device of the present invention.

Monomer mixture is prepared by dissolution of 45 grams of low molecular weight copolymer of methylmethacrylate with 2 mol. % of allylmethacrylate (MW approximately 10,000) in a mixture of 50 grams of methyl methacrylate, 4.95 grams of ethyleneglycol dimethacrylate and 0.05 weight parts of benzoin. Molten mixture is then filled into the mold depicted in FIG. 4. The mold 81 is a polypropylene cylinder of inner diameter 15 mm which has lids 83, 87 on each end. Core 85 of stainless steel rod of diameter 4.50 mm is inserted through the lids 83, 87 so that it is coaxial with the mold wall and sealed.

The mixture is then polymerized by UV lamp at ambient temperature first until vitrification, and then 6 hours at 125 deg. C.

The cooled plastic molding is then lathed using the stainless steel core as the shaft until concentricity is achieved. Then the polymer is carefully swollen in Ethoxy Ethyl Acetate to an inner diameter of about 6 mm and pulled over a slightly conical TEFLON mandrel (6.6×5.5 mm for 250 mm of length). The acetate is gradually extracted with methanol and dried at 110 deg. C.

Then the TEFLON mandrel is removed and the tubular device is used as a precision connecting element for various cylindrical articles of outside diameters between about 4.7 mm and 5.5 mm. Examples of articles to be connected and/or aligned are, for instance, shafts of electrical motors, to be connected with shafts of water pumps and other devices, tubings and capillaries, and so on.

EXAMPLE 5

Mixture of 59% methylmethacrylate, 39.9% acrylonitrile, 1.0% of ethyleneglycol-bis-acrylate and 0.1% dibenzoyl peroxide is polymerized by heating in flat molds with polypropylene inserts featuring rims of the shape and size of spectacle lenses.

Figure 5A:
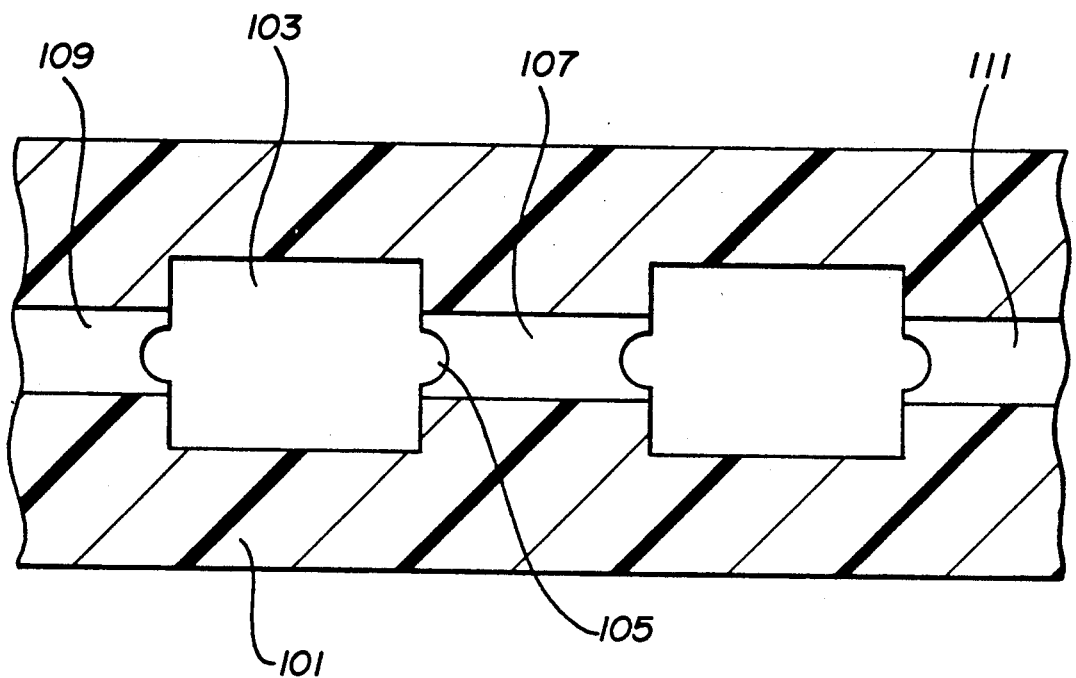
FIG. 5A and 5B show cut views of a present invention alignment device for alignment of spectacle or other optical lens.

FIG. 5A shows part of the mold assembly where 101 is the mold wall, 103 is the primary mandrel with lens-shaped rims 105, and spaces 107, 109 and 111 are filled with monomer mixture.

The polymer sheet is removed from the mold and swollen in methanol-acetone mixtures with gradually increasing acetone concentration, until the lens-shaped inserts can be readily removed and replaced with similarly shaped inserts but with the diameter increased by about 10%.

Figure 5B:
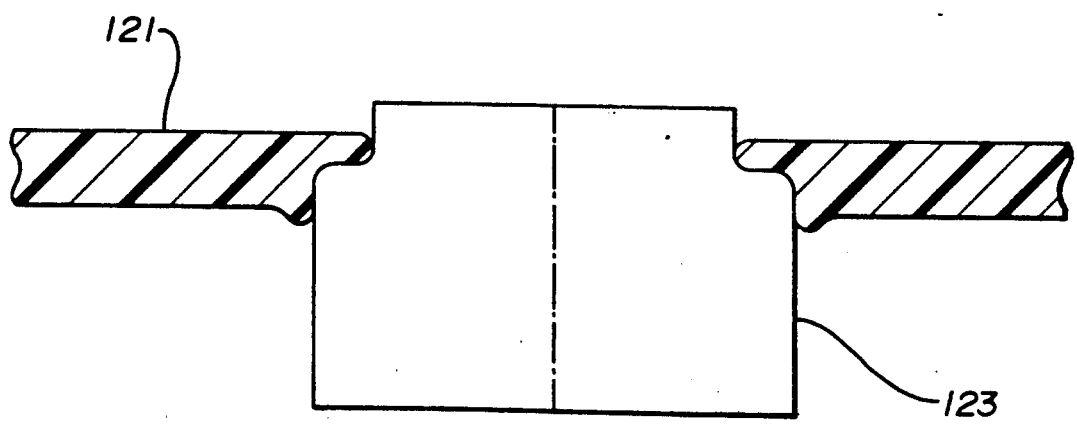

The polymer is then gradually deswollen and dried. The drying is finished at about 110 deg. C. The polymer becomes rigid and uniformly glassy as all its polymer components have a glass transition temperature around 100 deg. C. or higher. The profile of the polymer in its rigid deformed state is in FIG. 5B where 121 is the memory polymer and 123 is the secondary mandrel.

The Memory polymer thus formed is stronger, harder and more impact resistant than polymethylmethacrylate or similar purely amorphous resins due to a minor portion of crystalline network of polyacrylonitrile type which acts as additional physical network and reinforcing component. The crystals of PAN-type are not meltable below decomposition temperature (theoretical melting point of PAN is higher than 320 deg. C. while depolymerization and degradation of this polymer starts at about 200 deg. C.).

Part of the polymer material is then milled off to make the shape of spectacle frames with two secondary mandrels per frame; the secondary mandrels are then removed. The frames are now ready for receiving lenses and for final custom shaping. If the glass lenses are now inserted into the deformed sockets and heated to a temperature between about 100 (where the material becomes deformable under internal stresses, albeit the shape recovery is slow) and about 200 deg. C. (where the polymer decomposition starts), the lenses are secured into their mutually aligned positions.

Furthermore, the shape of the frame can be adjusted to the individual needs by a gentle shaping at temperatures above 100 deg. C.

EXAMPLE 6

Figure 6A:
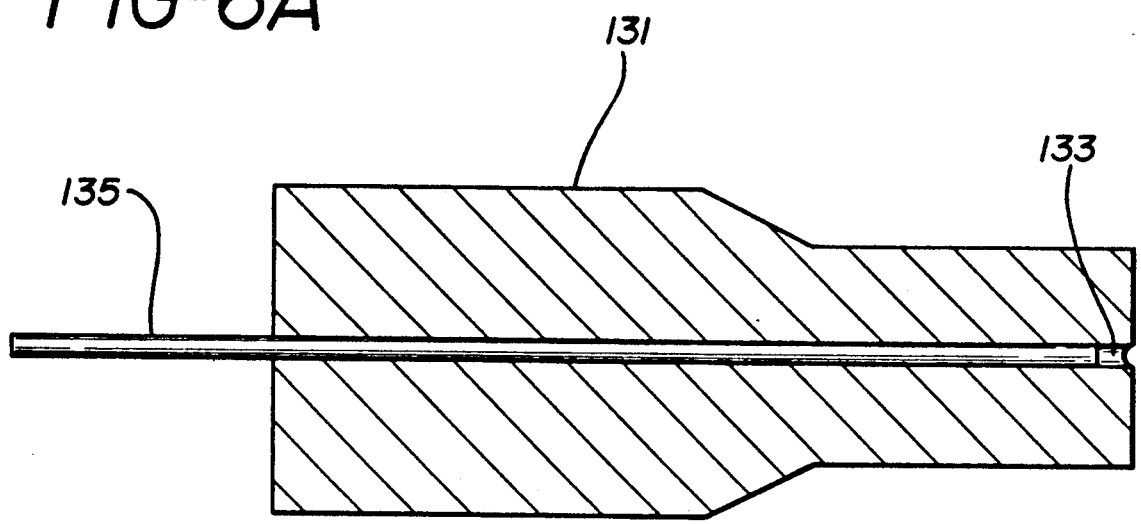
FIG. 6A, 6B, 6C and 6D illustrate side cut view details of present invention alignment devices and methods for interconnection of optical fibers with passive or active optical devices such as transmission sources, detectors, couplers, etc.

This example describes a device and method for the connection and precision alignment of optical fiber with a passive or active optical device including but not limited to optical sources (such as LEDs or laser diodes), optical detectors, couplers, wavelength-division multiplexers, and switches which are customarily "pig-tailed". "Pig-tailing" provides the device with a short length of optical fiber of which one end is fixed by an epoxy adhesive to the "face" of the device while the other is prepared for connection to another optical fiber by splicing, connectorizing, fusion etc. Currently, sophisticated X-Y-Z translation stages are used to align a fiber end with the active area of the optical device in order to epoxy the fiber to the device. Inherently, the intermediate pig-tail contributes to the device's transmission loss, cost and size. The Memory Polymer device which eliminates the need for pig-tailing can be manufactured in the following way:

1) Mandrel preparation: model of the shape of the optical device with connected optical fiber is made from suitable materials, such as stainless steel, glass, polypropylene, polyamide or a combination thereof. FIG. 6A shows one such possible mandrel where 131 is cylindrical block of stainless steel with central hole 133 along its axis. Denuded optical fiber 135 of diameter 110 microns is inserted into the tightly fitting hole 133 and secured there by epoxy adhesive.

Figure 6B:
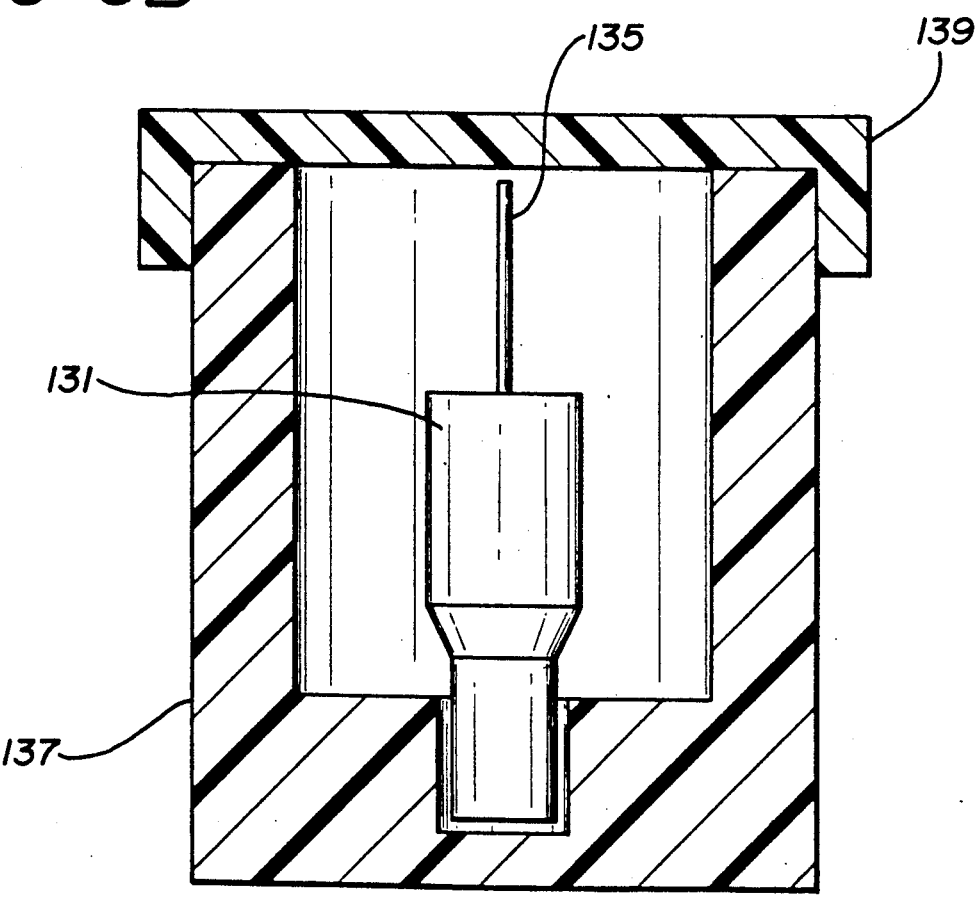

2) Polypropylene mold is made to match the mandrel. The assembled mold is in FIG. 6B where 137 is the body of the mold, 139 is the mold lid, 131 is the mandrel including the glass fiber 135.

3) The following monomer mixture is prepared: 100 grams of isobornyl methacrylate; 1.5 grams of ethyleneglycol-bis-methacrylate; 20 grams of toluene; and, 0.1 grams of azo-bis-isobutyronitrile.

The mixture is purged briefly by nitrogen, degassed briefly by a vacuum provided by water ejector pump and filled into the mold under a nitrogen blanket. The mold is tightly closed by its lid.

4) Mixture is cured by heating to 70 deg. C. for 6 hours and then to 120 deg. C. for 3 hours.

5) Mold is opened and the molding with mandrel is carefully extracted. The polymer is then gradually swollen in toluene until it grows in volume about 4 to 5 times. Mandrel can then be readily extracted from the rubbery polymer and is ready for reuse.

6) Swollen polymer is trimmed of any overflows and its stem is cut at an angle of about 45 degrees with respect to the axis of the optical fiber.

Figure 6C:
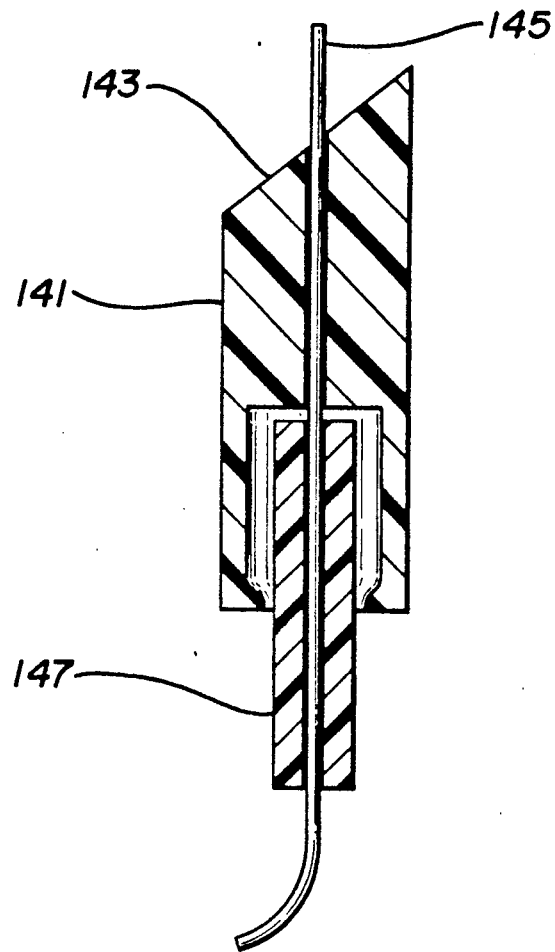

7) Two part secondary mandrel is inserted consisting of Nylon fiber of diameter about 0.140 mm and polypropylene cylinder with central hole about 0.150 mm. The outside diameter of this mandrel is about 10% larger than diameter of the primary mandrel. The secondary mandrel and molding are assembled as indicated in FIG. 6C, where 141 is the swollen polymer with angled end 143; 145 is the Nylon mandrel and 147 is the polypropylene mandrel.

8) Toluene is then gradually replaced by methanol, and methanol is then dried out at temperatures gradually increasing from about 50 deg. C. to about 125 deg. C.

Figure 6D:
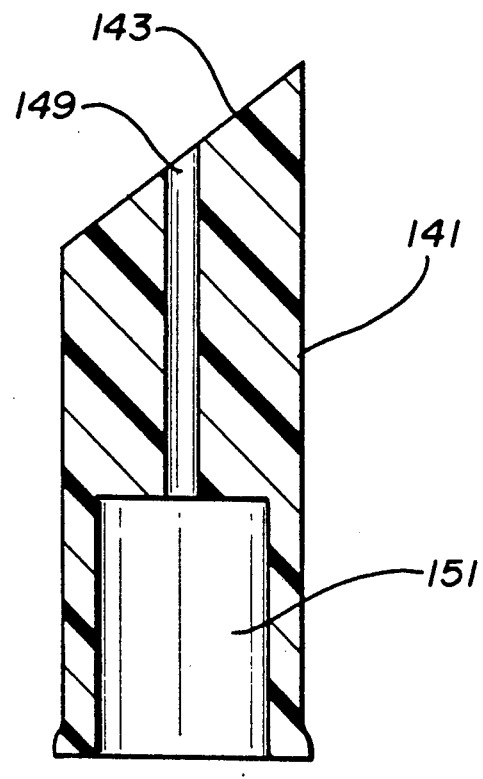

9) Mandrels are extracted from the deformed IMP body as depicted in FIG. 6D where 141 is the IMP body, 149 is cavity of diameter enlarged to about 140 microns and ready to receive optical fiber of diameter between about 100 and 135 microns (including standard size 110 and 125 microns); 151 is enlarged cavity ready to receive the respective optical device; 143 is the angled face facilitating the optical fiber insertion.

The installation procedure can be described by the following steps:

1) A drop of suitable epoxy adhesive is placed on the active "face" of the optical device (eg. a laser diode);
2) The device is inserted into the cavity 151;
3) Denuded and cleaved fiber is inserted into the cavity 149 until it contacts the optical device;
4) The whole assembly is heated to a temperature between about 110 and 130 deg. for a short time (eg. by a heat gun) until the memory material collapses around the connected components.

At the same time, curing of the epoxy is initiated. The device can then be optionally heated to a temperature of 50 to 100 deg. to improve and finish the epoxy curing. However, this is generally not necessary, because the adhesive cure continues even at ambient temperature albeit at a slower rate.

This device and method saves considerable installation time and eliminates the need for costly devices such as aligning X-Y-Z translators or mechanical splices. It also eliminates one connection thereby decreasing losses and making for a very compact, light-weight assembly.

It can be appreciated that the apparatus described here is simplified for illustration purposes. It can be more complicated to accommodate multiple devices, facilitate incorporation into larger assemblies or instruments etc.

EXAMPLE 7

This example describes one combination of measures according to our invention to achieve precise alignment and mutual positioning of optical elements useful for both light and charged-particle optics. The goal is to demonstrate the possibility of combining high precision, speed of assembly and operation, and durability using a simple and inexpensive device. At the same time, we are using this Example to illustrate the option of suppressing the Ts of IMP by plastification by monomers which are polymerized in a subsequent step after the alignment has been achieved.

The mold is assembled in the following way:

1) One precision stainless steel rod of larger diameter and three precision steel rods of smaller diameter are fitted parallel to one another between two baseplates. The larger rod centered between the baseplates, and the three smaller rods positioned equidistant from one another and from the central larger rod, thus forming an equilateral triangle defined by the axes of the smaller rods.

Figure 7A:
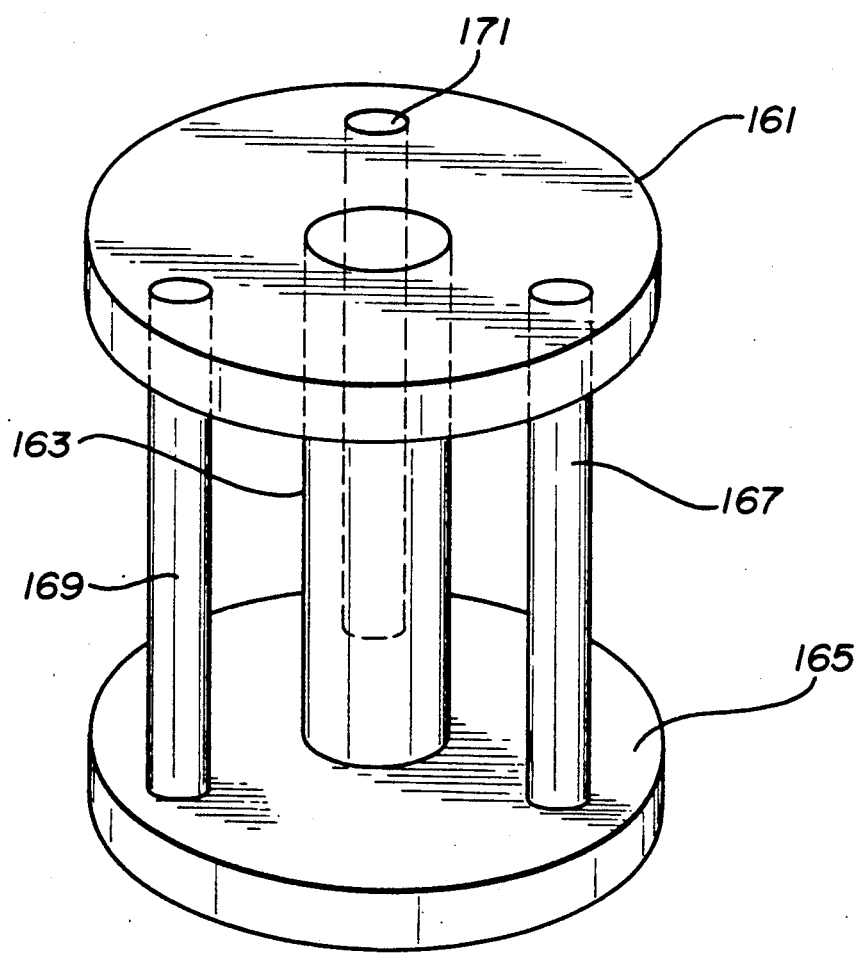
FIG. 7A shows an oblique view of a subassembly mold die involving present invention alignment and mutual positioning of optical elements useful for both light and charged particle optics; and, FIG. 7B shows a cut, frontal oblique view of a plasticized multilumen tube for present invention alignment, i.e. creating the assemblage of an electron gun.

The sub-assembly is depicted in FIG. 7A where 161, 165 are the base-plates; 163 is the large-diameter rod and 167, 169 and 171 are the small-diameter rods.

2) This sub-assembly is fitted into matching tubular polypropylene mold.

3) Polybenzylmethacrylate copolymer with 5 mol. % allymethacrylate is plasticized with 25% toluene and 25% benzyl acrylate to form gelatinous mass melting at moderately elevated temperature. The melt is filled into the mold cavity by a moderate pressure.

4) Mold is closed and exposed to Gamma-radiation to initiate polymerization of the monomers with simultaneous crosslinking.

5) The mold is disassembled, the molding swollen in toluene, the primary mandrel is disassembled and removed from the swollen polymer mass. The rubbery mass has the shape of a tube with 4 parallel lumen or bores.

6) The tube is now swollen in mixture of toluene, isobornyl methacrylate, ethylene glycolimethacrylate and benzoin. The composition of the mixture without toluene is such that the ratio of benzoin to glycoldimethacrylate is 1:3 and content of benzoin is 0.2%. The toluene concentration is calculated so that after the toluene is evaporated, the polymer is plasticized with about 30% of the monomer mixture.

7) Swollen tube is cut to shorter pieces and slightly conical TEFLON mandrels (diameter about 10% larger than primary mandrels) are placed into the appropriate cavities.

8) Toluene is carefully evaporated and mandrels are removed from the cavities.

Figure 7B:
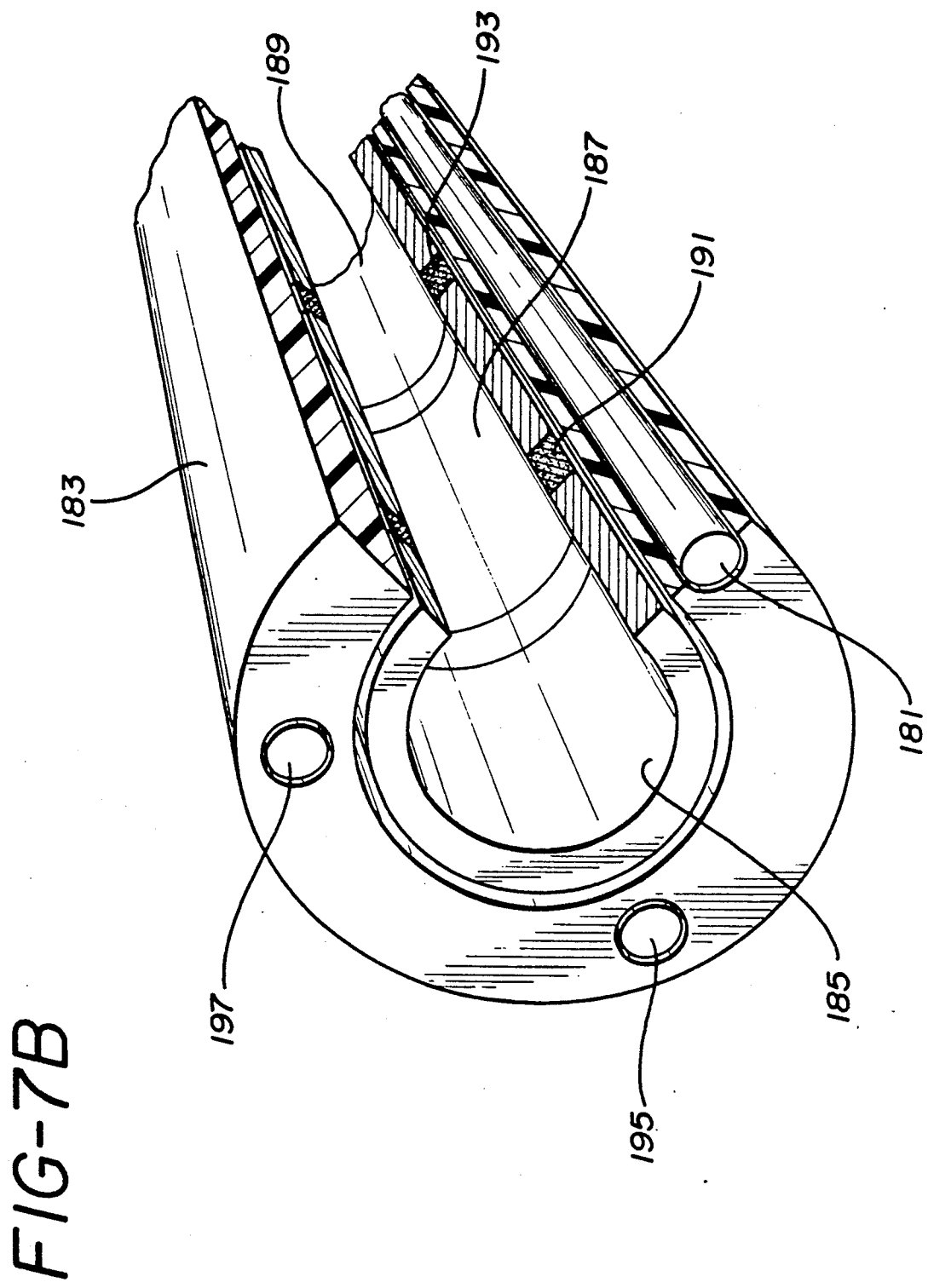

The polymer is now plasticized by the monomers introduced during the swelling step so that its softening temperature is depressed to about 50 deg. C. The plasticized multilumen tube as depicted by 183 in FIG. 7B, can be used for alignment and assembly of the elements of an electron gun in the following manner:

1) Electrostatic lenses (metal tube sections) 185, 187 and 189, and insulating and distancing elements (ceramic tube sections) 191 and 193, of same outside diameters are inserted into the tube in appropriate order.

2) Aligning pins, or rigid rods 181, 197 and 195, of diameter of the original primary mandrels 167, 169 and 171, are inserted into appropriate cavities.

3) The IMP tube with inserted elements is placed on vertical pin and placed into oven with the temperature slightly higher than Ts of the plasticized IMP (ie. about 50 deg. C.).

4) After the IMP shape recovery and alignment of tubular elements, the assembly is cooled to ambient temperature. The precise alignment is facilitated by the continuous aligning pins surrounding the central cavity.

5) The assembly is placed under a nitrogen blanket and exposed to UV light. As the monomers which plasticized the IMP polymerize, the softening temperature of IMP increases to a valve above 100 deg. C. Because the crosslinking density of the polymer increases$considerably, the polymer jacket holding and aligning the elements is substantially rigid and dimensionally stable over a wide range of temperatures.

6) The assembly can be now trimmed, drilled to install electrical connections etc.

What is claimed is:

1. A device for precise positioning of one or more articles with respect to said device, which comprises:
   a unistructural mass of inherent shape memory polymer material having at least one open cavity formed into the inside of said mass, said mass having a first shape and a second shape:
   (a) said first shape being a unique, recoverable, predetermined, inherent shape and position within said mass, said inherent shape of said open cavity having at least one cross-sectional configuration of the article to be precisely positioned, said cavity cross-sectional configuration being of equal or smaller size than said cross-sectional configuration of said article to accommodate and tightly hold at least a portion of said article; and,
   (b) said second shape being a deformed and enlarged shape of said mass wherein said cross-sectional configuration of said open cavity is larger than said cross-sectional configuration of said article so as to loosely and freely receive at least a portion of said article;
   said mass being in said second shape and being capable of being returned to said first shape for precise positioning of said article by application of non-mechanical stimulus to said mass.

2. The device of claim 1 wherein said mass of inherent shape memory polymer material has been initially formed in said first shape, then swollen, then partially shrunk to said second shape for subsequent return to said first shape by application of a non-mechanical stimulus thereto.

3. The device of claim 1 wherein the said unistructural mass is crosslinked amorphous organic polymer with a glass transition temperature higher than 25 degrees C. but lower than 200 degrees C.

4. The device of claim 3 wherein the said amorphous crosslinked polymer has a glass transition temperature between 50 degrees C. and 150 degrees C.

5. The device of claim 3 wherein the said amorphous crosslinked polymer consists of at least one monomer selected from derivatives of acrylic acid, methacrylic acid and styrene.

6. The device of claim 5 wherein the said derivatives is ester of methacrylic acid and alcohol with one to ten carbon atoms.

7. A device for precision alignment of two or more articles, which comprises:
   a unistructural mass of inherent shape memory polymer material having three dimensions and having at least two cavity-containing ends which include a first cavity at one of said cavity-containing ends formed into the inside of said mass, and a second cavity at another of said cavity-containing ends formed into the inside of said mass to and in a predetermined alignment with said first-cavity, said mass having a first shape and a second shape:
(a) said first shape being a unique, recoverable, predetermined inherent shape wherein said first cavity and said second cavity each have a preset cross-sectional configuration to accommodate and tightly hold at least a portion of articles to be aligned with one another; and,
(b) said second shape being a deformed and enlarged shape of said inherent memory polymer material wherein said first cavity and said second cavity each have an enlarged predetermined cross-sectional configuration greater than the cross-sectional configurations of the portions of the articles to be held so as to loosely and freely receive said portions of said articles;

said mass of inherent shape memory polymer material being in said second shape and being capable of being returned to said first shape for precision alignment of said two or more articles by application of a non-mechanical stimulus to said mass.

8. The device of claim 7 wherein said mass of inherent shape memory polymer material has been initially formed in said first shape (inherent shape), then swollen, then partially shrunk to said second shape (deformed shape) for subsequent return to said first shape by application of a non-mechanical stimulus thereto.

9. The device of claim 8 wherein said swelling is by solvent swelling.

10. The device of claim 7 wherein a plurality of cavity-containing ends in excess of two cavities are included, and each contains at least one cavity for receiving at least a portion of an article to be aligned, for precision alignment of more than two articles.

11. The device of claim 7 wherein said first cavity and said second cavity are formed for alignment and subsequent connection of two or more articles.

12. The device of claim 7 wherein said cavities are formed such that the articles are not in direct contact with one another when held by said device upon return to said first shape.

13. The device of claim 7 wherein the said unistructural mass is crosslinked amorphous organic polymer with a glass transition temperature higher than 25 degrees C. but lower than 200 degrees C.

14. The device of claim 13 wherein the said amorphous crosslinked polymer has a glass transition temperature between 50 degrees C. and 150 degrees C.

15. The device of claim 13 wherein the said amorphous crosslinked polymer consists of at least one monomer selected from derivatives of acrylic acid, methacrylic acid and styrene.

16. The device of claim 15 wherein the said derivatives is ester of methacrylic acid and alcohol with one to ten carbon atoms.

17. The device of claim 7 wherein said first cavity and said second cavity contain central axes which are in linear alignment with one another.

18. The device of claim 17 wherein said unistructural mass is trapezoidal and the largest of its rectangular faces is about parallel to the central axes of said cavities.

19. The device of claim 7 wherein said first cavity and said second cavity contain central axes which are not linearly aligned with one another.

20. The device of claim 19 wherein said central axes are parallel to one another.

21. The device of claim 19 wherein said central axes are not parallel to one another.

22. The device of claim 7 wherein said unistructural mass has a shape which is asymmetrical.

23. A method of preparing a device for precision alignment of two or more articles which comprises:
(a) polymerizing a monomer mixture of inherent shape memory polymer so as to create a unistructural mass having three dimensions and having at least two cavity containing ends which include at least a first cavity at one of said cavity-containing ends into the inside of said mass, and a second cavity at another of said cavity-containing ends into the inside of said mass to and in a predetermined alignment with said first cavity, each of said cavities having a predetermined cross-sectional configuration equal to or less than the cross-sectional configuration of at least a portion of articles to be aligned;
(b) swelling the inherent shape memory polymer to an enlarged size such that each of said cavities has an enlarged cross-sectional configuration which is greater than the cross-sectional configuration of a portion of said articles to be aligned;
(c) partially shrinking the swollen inherent shape memory polymer by solvent removal to a deformed shape such that each of said cavities has a predetermined cross-sectional configuration which is less than the fully swollen cross-sectional configuration but nonetheless greater than the cross-sectional configuration of the portions of said articles to be aligned.

24. The method of claim 23 wherein said polymerizing is carried out to create said unistructural mass by being reacted about portions of one or more select articles to be aligned or duplicates thereof.

25. The method of claim 24 wherein said swelling is performed by soaking in one or more thermodynamically good solvents.

26. The product resulting from the method of claim 25.

27. The method of claim 24 wherein, after said swelling, at least one slightly enlarged duplicate of a portion of an article to be aligned is inserted into said cavities and then said shrinking is performed while said slightly enlarged duplicate is inserted, and further wherein said slightly enlarged duplicate is removed after said shrinking.

28. The product resulting from the method of claim 27.

29. The product resulting from the method of claim 24.

30. The method of claim 23 wherein swelling is performed by soaking in one or more thermodynamically good solvents.

31. The method of claim 30 wherein, after said swelling, at least one slightly enlarged duplicate of a portion of an article to be aligned is inserted into said cavities and then said shrinking is performed while slightly enlarged duplicate is inserted, and further wherein said slightly enlarged duplicate is removed after said shrinking.

32. The product resulting from the method of claim 31.

33. The product resulting from the method of claim 30.

34. The method of claim 23 wherein, after said swelling, at least one slightly enlarged duplicate of a portion of an article to be aligned is inserted into said cavities and then said shrinking is performed while said slightly enlarged duplicate is inserted, and further wherein said slightly enlarged duplicate is removed after said shrinking.

35. The product resulting from the method of claim 34.

36. The method of claim 23 wherein said monomer mixture is selected from derivatives of acrylic acid and methacrylic acids.

37. The product resulting from the method of claim 36.

38. The method of claim 36 wherein said derivatives are esters of alcohols.

39. The product resulting from the method of claim 38.

40. The method of claim 38 wherein said alcohols have 1 to 10 carbon atoms.

41. The product resulting from the method of claim 40.

42. The method of claim 40 wherein said monomer mixture includes methylmethacrylate and butylmethacrylate.

43. The product resulting from the method of claim 42.

44. The product resulting from the method of claim 23.

45. A method of precise alignment of two or more articles, which comprises:
(a) inserting portions of at least two articles to be aligned into an alignment device having a unistructural mass of inherent shape memory polymer material having three dimensions and having at least two cavity-containing ends which include a first cavity at one of said cavity-containing ends into the inside of said mass, and a second cavity at another of said cavity-containing ends into the inside of said mass to and in predetermined alignment with said first cavity, said mass having a first shape which is unique, recoverable, predetermined inherent shape wherein said first cavity and said second cavity each have a preset cross-sectional configuration to accommodate and tightly hold portions of articles to be aligned in precise alignment with one another; and, said mass having a second shape which deformed shape is caused by solvent swelling of said inherent memory polymer material wherein said first cavity and said second cavity each have a swollen predetermined cross-sectional configuration than that of the portions of articles to be aligned so as to loosely and freely receive said portions of said articles to be aligned;
said mass of inherent shape memory polymer material having been initially formed in said first shape (inherent shape) and having been swollen then partially shrunk to said second shape (deformed shape) prior to the insertion of said portions of said articles to be aligned; and,
(b) after said insertion, applying a non-mechanical stimulus to said unistructural mass so as to return it to its inherent shape to align and hold said portions of said articles.

46. The method of claim 45 wherein said non-mechanical stimulus is heat.

47. A device for alignment of two or more articles, which comprises:
(a) a plurality of unistructural masses of inherent shape memory polymer material, each such unistructural mass having at least one cavity-containing end which includes a first cavity into the inside of said mass positioned for predetermined alignment, said mass having a first shape and a second shape:
(i) said first shape being a unique, recoverable, predetermined inherent shape wherein said first cavity has a preset cross-sectional configuration to accommodate and tightly hold at least a portion of an article to be aligned; and,
(ii) said second shape being a deformed shape caused by solvent swelling of said inherent memory polymer material wherein said first cavity has a swollen predetermined cross-sectional configuration greater than the cross-sectional configuration of a portion of an article to be held so as to loosely and freely receive said portion of said article;
said mass of inherent shape memory polymer material having been initially formed in said first shape (inherent shape) and having been swollen then partially shrunk to said second shape (deformed shape), and capable of being returned to said first shape by application of a non-mechanical stimulus thereto; and,
(b) means for aligning said plurality of unistructural masses to one another.

48. The device of claim 47 wherein said means for aligning said plurality of unistructural masses to one another is an independent means for holding the masses as desired.

49. The device of claim 48 wherein said means for aligning said plurality of unistructural masses to one another is a means which is designed into and built into one or more of said unistructural masses.

50. The device of claim 48 wherein the said unistructural masses are crosslinked amorphous organic polymer with a glass transition temperature higher than 25 degrees C. but lower than 200 degrees C.

51. The device of claim 50 wherein the said amorphous crosslinked polymer has a glass transition temperature between 50 degrees C. and 150 degrees C.

52. The device of claim 50 wherein the said amorphous crosslinked polymer consists of at least one monomer selected from derivatives of acrylic acid, methacrylic acid and styrene.

53. The device of claim 52 wherein the said derivative is ester of methacrylic acid and alcohol with one to ten carbon atoms.

* * * * *